Jan. 16, 1923.
S. J. SWANSON.
WINDMILL.
FILED AUG. 10, 1921.
1,442,307.
2 SHEETS—SHEET 1.
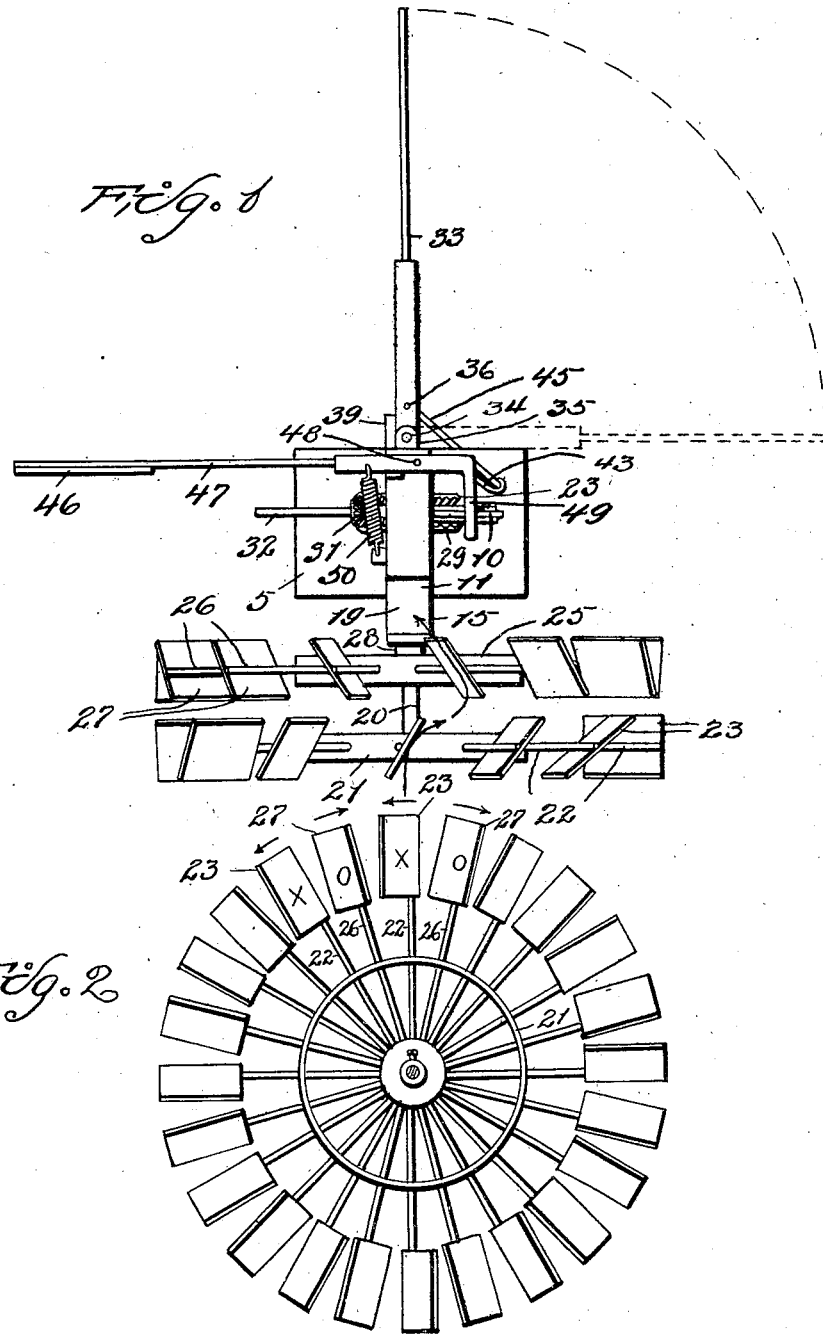
INVENTOR
SWAN J. SWANSON,
by Arthur C Eckert ATTORNEY.

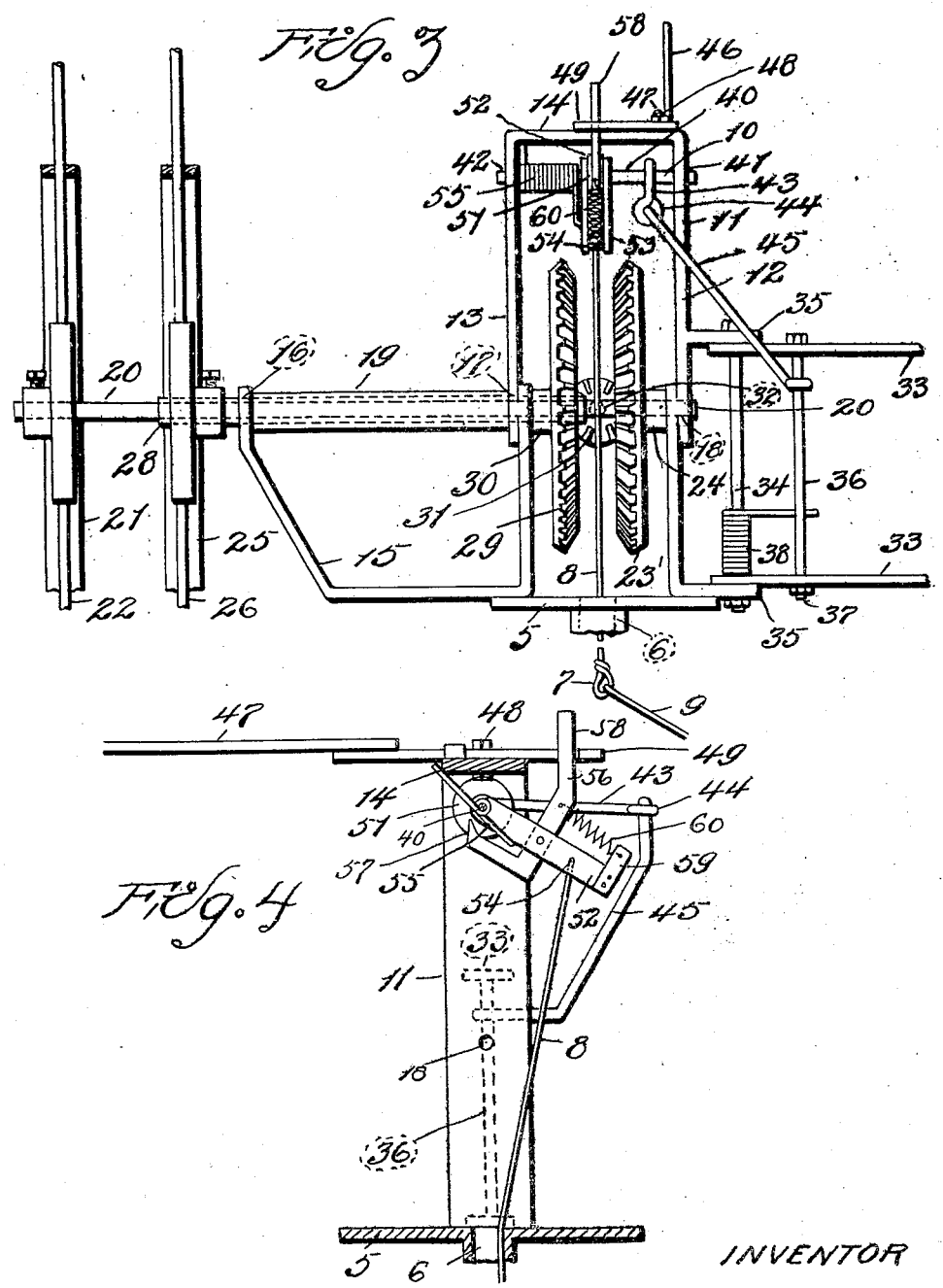

Patented Jan. 16, 1923.

1,442,307

UNITED STATES PATENT OFFICE.

SWAN J. SWANSON, OF ST. LOUIS, MISSOURI, ASSIGNOR OF ONE-HALF TO FRED H. BLANKENHORN, OF ST. LOUIS, MISSOURI.

WINDMILL.

Application filed August 10, 1921. Serial No. 491,065.

*To all whom it may concern:*

Be it known that SWAN J. SWANSON, a citizen of the United States of America, residing at 110 South Tenth Street, in the city of St. Louis and State of Missouri, has invented certain new and useful Improvements in Windmills, of which the following is a specification.

The object of my invention is to produce a wind-mill with a plurality of sets of vanes which will subtract practically all the energy from the wind that reaches the wind-mill and thereby raise the efficiency of the wind-mill to a maximum. Another object is to devise a means of automatically stopping the wind-mill from functioning when the wind attains a certain predetermined velocity. In other words, it becomes desirable in a storm or hurricane to revolve the vanes out of the path of the wind in order that the enormous wind velocity will not destroy the vanes and so that the useful work that the wind-mill is made to accomplish will cease during this period. For instance, if the wind-mill is made to operate an electric generator which in turn is charging a storage battery, it becomes necessary that the speed of the generator must be maintained less than a certain number of revolutions a minute. This speed will depend upon the velocity with which the wind-mill rotates. When the wind-mill exceeds a certain velocity, therefore, it must become inoperative in order to prevent the generator from operating too rapidly. This cessation of operation of the wind-mill must be accomplished automatically. My structure accomplishes this purpose.

In addition, my structure is simple, economical, and lends itself readily to multiple production, is made of few and simple parts, and can be readily assembled.

With these and other objects in view, my invention has relation to certain novel features of construction and arrangement of parts as will be hereinafter more fully described, pointed out in the claims and illustrated in the drawings in which—

Fig. 1 is a plan view,
Fig. 2 is a front elevation of the vanes,
Fig. 3 is a side elevation, and
Fig. 4 is a fragmental sectional elevation of my tripping device.

The windmill tower is not shown in the drawings. Numeral 5 designates a base plate for my device which is mounted on the conventional wind-mill tower. (Not shown.) A hole 6 is formed in the center of the base plate 5. Through this hole means (not shown) for securing the base plate 5 rotatively to the tower are inserted. An eye 7 is secured to the wire 8 and a cord 9 is secured in the eye 7. The cord 9 leads to the bottom of the tower (not shown) and offers means (which will be subsequently described) for setting the blades in operative position. The upper end of the wire 8 is secured to the tripping mechanism 10, which will be subsequently described. Numeral 11 designates a frame secured to the base plate 5 which frame is composed of two vertical standards 12 and 13 which are integrally connected at the top by the cross piece 14. An arm 15 extending laterally is formed integrally with the standard 13. A hole 16 is formed in the arm 15; a hole 17 is formed in the vertical standard 13 and a hole 18 is formed in the vertical standard 12. These three holes are of substantially the same diameter and in horizontal alignment. This is best shown in Fig. 3. A tube 19 connects the holes 16 and 17 and is secured to the arm 15 and the vertical standard 13. Numeral 20 designates a shaft to which at its outer end is secured the wheel 21, having the spokes 22 and the vanes 23 secured to the end of the spokes. The shaft 20 passes through the tube 19. A bevel gear 23' having the hub 24 is secured to the shaft 20 between the vertical standards 12 and 13. The end of the shaft 20 extends into the hole 18.

Numeral 25 designates a second wheel having spokes 26 and vanes 27, the vanes being secured at the ends of the spokes. The wheel 25 is mounted on the tube 28 which is slipped over the shaft 20 and through the tube 19. Numeral 29 designates a bevel gear having the hub 30 which bevel gear is secured to the tube 28 at its inner end between the vertical standards 12 and 13. The tube 19 functions as a journal box for the tube 28 and the tube 28 functions as a journal box for the shaft 20. The hole 18 functions as a journal box for the end of the shaft 20. It will be seen that when the wheel 21 is rotated, the bevel gear 23' is likewise rotated and that when the wheel 25 is rotated, the bevel gear 29 is rotated. Numeral 31 designates a bevel pinion mounted on a shaft 32. The bevel gears 23' and 29 are in mesh with the bevel pinion 31. It will be seen that when the wheel 21 is moved in one direction, and the wheel 25 in the opposite direction that the bevel gears 23′ and 29 will be moved in opposite directions and rotate the bevel pinion 31 in one direction. In order that the wind will operate the wheels 21 and 25 in opposite directions, the vanes 23 and 27 must be properly positioned relative each other. These vanes are rectangular plates secured to the spokes in the following manner. The vanes on the wheel 21 are positioned as best shown in Fig. 1, i. e., they are secured to the spokes near one of their longitudinal edges, with the longitudinal edges parallel to the spokes and at an angle of substantially 45 degrees with a diametral plane passing through the spoke which the vane in consideration is positioned. The vanes on the wheel 25 are similarly positioned only at an angle of about 90 degrees with them. When the wind impinges the vanes in the outer wheel 21, it causes the wheel to move and is then deflected until it strikes the vanes on the inner wheel 25. The direction of the wind is shown by the arrows in Fig. 1. In Fig. 2 all the vanes belonging to the wheel 21 are marked X and all belonging to the wheel 25 are marked O. The arrows show the direction of travel of the vanes. The shaft 32 is direct connected to a generator (not shown) which does the work for which the windmill is designed.

Numeral 33 designates a guide, which is rotatively secured to the vertical standard 12 by means of a shaft 34, which passes through eyes formed in the projections 35 on the standard 12. Numeral 36 designates a rod connecting the side frame elements of the guide 33 and extending beneath the lower frame element at 37. Numeral 38 designates a curled spring wrapped around the shaft 34 with one end in contact with the rod 36 and the other end fastened to the inner projection 35. By these means the guide 33 is normally held in a position parallel to the wheels 21 and 25. When the guide 33 is in its normal position, the wheels will be held parallel to the direction of the wind and not against it and will not rotate, i. e., the mill will not operate. The problem now resolves itself into establishing means by which the guide 33 can be swung ninety degrees from its normal position and secured in that position until a predetermined wind velocity is reached when it must be automatically returned to its normal position.

Numeral 39 designates a finger secured to the plate 5 and protruding outward which limits the swing of the guide 33 to ninety degrees from its normal position. Numeral 40 designates a rod rotatively secured in the vertical standards 12 and 13 at 41 and 42. An arm 43 is secured to the rod 40 which arm has a hook 44 formed at its end. A link 45 has hooks formed at each end, one of which is secured to the rod 36 and the other to the hook 44 of the arm 43. A rotation of the guide 33 thereby rotates the rod 40. Numeral 46 designates a pressure plate secured to the rod 47 which rod is rotatively secured to the cross-piece 14 by the bolt 48 and terminates in a hook 49 at the opposite side of the cross-piece 14 from the pressure plate 46. The pressure plate 46 is normally held in a position parallel to the planes of the wheels 21 and 25. A coil spring 50 is secured to the rod 47 at one end near the cross-piece 14 and on the same side of it as the pressure plate 46. The other end of this spring is secured to the cross-piece 14. The spring 50 is pressure graduated, i. e., it requires a definite pressure to extend it. This spring holds the pressure plate 46 in its normal position. By making the spring 50 of a predetermined strength, it will require a predetermined pressure and hence wind velocity on the pressure plate 46 to move it from its normal position. A ratchet wheel with one notch 51, is secured to the rod 40. Two plates 52 and 53 are rotatively secured to the rod 40, in spaced relationship with each other with the ratchet wheel 51 between them. The plates 52 and 53 are secured to each other at their external ends by means of the rivet 54. The upper end of the wire 8 is secured to the rivet 54. A coiled spring 55 is wrapped around the rod 40 on one side of the plates 52, the one end of which is secured to the rivet 54 and the other end to the cross-piece 14. This spring holds the plates 52 and 53 upwardly substantially against the cross-piece 14. Numeral 56 designates a hook rotatively secured between the plates 52 and 53 and terminating at one end in the pawl 57 which in one of its positions engages the notch in the ratchet wheel 51 and terminating at its other end in the arm 58 which by means of the spring 55 is normally held against the cross-piece 14. Numeral 59 designates a finger extending from the face end of one of the plates 52 or 53 upwardly. Numeral 60 designates a coiled spring secured at one end to the finger 59 and at the other to the arm 58 of the hook 56. The operation of my device is as follows. When the wheels are to operate, the cord 9 is pulled downwardly thereby rotating the rod 40 and bringing the guide 33 to its operative position. The cord 9 is then fastened to the tower near the bottom of the tower. When the wind pressure reaches the predetermined velocity at which it is desired to automatically stop the rotation of the wheels, the pressure plate 46 is moved and rotated on the cross-piece 14 until it engages the arm 58 which releases the pawl 57 from its notch in the ratchet wheel 51 and permits the guide 46 to rotate ninety degrees.

What I claim and mean to secure by Letters Patent is:

1. In a wind-mill, a base plate, a frame, said frame secured to said base plate, wheels rotatively secured on said frame, a pressure plate and means of automatically revolving said base plate, responsive to a predetermined pressure on said pressure plate.

2. In a windmill, a base plate, a frame, said frame secured to said base plate, wheels rotatively secured on said frame, a guide rotatively secured to said frame, manual means of revolving said guide to an operative position, a pressure plate rotatively secured to said frame, and means of automatically revolving said base plate responsive to a predetermined pressure on said pressure plate.

3. In a windmill, a base plate, a frame, said frame secured to said base plate, wheels rotatively secured in said frame, a guide rotatively secured to said frame, a wire, a tripping mechanism, a pressure plate rotatively secured to said frame and means of automatically revolving said base plate to an inoperative position responsive to a predetermined pressure on said pressure plate, by actuating said tripping mechanism.

In testimony whereof I affix my signature.

SWAN J. SWANSON.